(12) United States Patent
Chau

(10) Patent No.: US 12,093,922 B2
(45) Date of Patent: Sep. 17, 2024

(54) ANIMATING QR CODE FOR MOBILE PAYMENT

(71) Applicant: Tsz Him Chau, Tsing Yi (HK)

(72) Inventor: Tsz Him Chau, Tsing Yi (HK)

( * ) Notice: Subject to any disclaimer, the term of this patent is extended or adjusted under 35 U.S.C. 154(b) by 190 days.

(21) Appl. No.: 17/535,591

(22) Filed: Nov. 25, 2021

(65) Prior Publication Data

US 2023/0162172 A1   May 25, 2023

(51) Int. Cl.
*G06F 16/90* (2019.01)
*G06K 7/14* (2006.01)
*G06Q 20/16* (2012.01)
*G06Q 20/32* (2012.01)
*G06Q 20/38* (2012.01)
*H04M 1/72427* (2021.01)

(52) U.S. Cl.
CPC ....... *G06Q 20/3276* (2013.01); *G06K 7/1417* (2013.01); *G06K 7/1439* (2013.01); *G06Q 20/16* (2013.01); *G06Q 20/3274* (2013.01); *G06Q 20/3825* (2013.01); *H04M 1/72427* (2021.01)

(58) Field of Classification Search
None
See application file for complete search history.

(56) References Cited

U.S. PATENT DOCUMENTS

| | | | |
|---|---|---|---|
| 2013/0166441 A1* | 6/2013 | Kobylkin | G06Q 20/348 705/35 |
| 2021/0256484 A1* | 8/2021 | Kim | G06Q 20/3263 |
| 2021/0279756 A1* | 9/2021 | Alanis Lopez | G06Q 30/0641 |

* cited by examiner

*Primary Examiner* — Baoquoc N To
(74) *Attorney, Agent, or Firm* — W&P

(57) ABSTRACT

A mobile computing system comprises a transitory memory storing QR code animation information, wherein the QR code animation information comprises reassembling QR codes from a plurality of animation frames. A mobile payment provider generates a QR code, wherein the QR code authorizes a payment transaction between a shopper and a merchant. The QR code is split into a plurality of frames for animation display. The plurality of frames is reassembled to obtain a second QR code. The second QR code is provided to the mobile payment provider. The mobile payment provider generates information to enable the merchant to conduct the payment transaction with the shopper on the second device, wherein the information uniquely identifies the merchant account and ties the payment transaction to the shopper device. Further, the mobile payment provider provides the transactional information to the merchant.

2 Claims, 6 Drawing Sheets

Sample QR code generated for mobile payment

```
iVBORw0KGgoAAAANSUhEUgAAALAAAAACwCAYAAACvt+ReAAAAAXNSR0IArs4c6QAAAARnQU1BAACxjwv8
YQUAAAAgY0hSTQAAeiYAAICEAAD6AAAAgOgAAHUwAADqYAAAOpgAABdwnLpRPAAAAAIwSFIzAAALEgAA
CxIB0t1+/AAACmBJREFUeF7tndtS5DoMAOH/P3oPw0lVe4ijuG1p7ExTxVMi69aSFc/t/e3c/H/9Z/
f/4wF97f35t+0zXPAImtj9qqyCwzfOXpkf+v/D0fQ35nfaMFAqFrfmTm75/xh/+PvUWxbw/vtCAGuGqhq
fQK8CdwE3q3qbRYvXZYXZNCk6GP2rJLU7MDnxRoBIB24Lm7vQAL8N0LBzhG6Zp0+6Vy1E4qR+2s
IqP+UbnhIv9NTCKo0Qy5ypKWTymX4QB+qVpJbJ4L4CXXJ2JhSS4CXJJ2Rhj5aaaNWy1eGK/BPg6ow/aWIc9u
jhl1e0Si+qh/VC6y0w5MlztTLLkqUAP8+Ow6P0SbnaGi56gPGQPQuEq/2j+oBrQyKRnbgDZ7z7cWP20TX0Y
ysjmMzCNWQQi3WEEGLzfQ4D0nvyQswKCz0W4wiAwAJ8+BKmI8QxGNxxoflyGk0+jhCOELbaiYCDKB4VBoN
HJXL6Bh0vIg6DZ0RK+UyAhnFxQ4Mio1CSsgtFZkBPslVmk01SvaWa2xGnvxBwFJDDwDjNkNaN0H2Y6
QjRGGNqbquHLAkOAJ8+WGYmqzXnAhy1CkddvHzg+E41mgBnn/I7ncmfBi0lw09s6XJBcMGFcMKYORLcuKItBuQ
OcoB1fcSIwNZs6XJJ0JJ8NMHKYYzqOjG+gQY+I9ZYInGX2LcDuaDH
...
```

FIG. 1

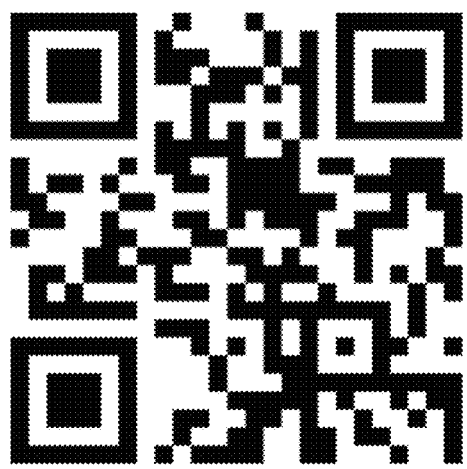
2KB QR Code
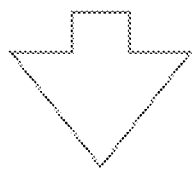
Split into 47 animation frames
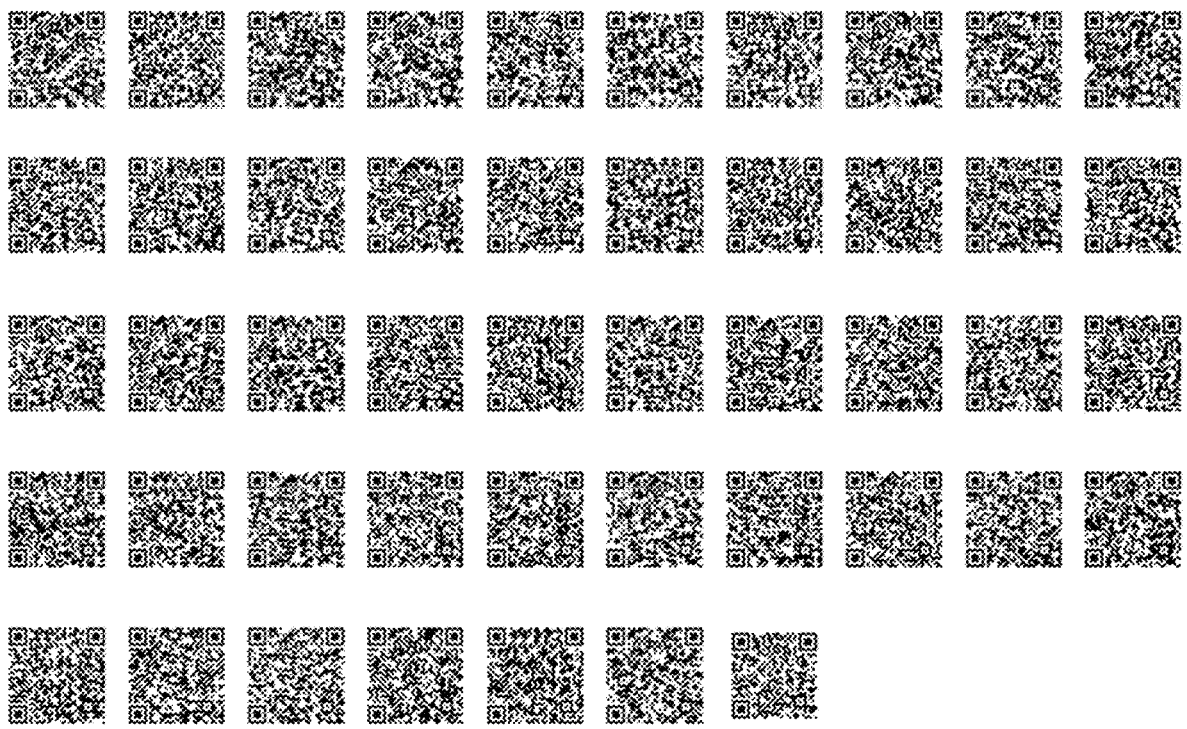
FIG. 2

ANIMATING QR CODE FOR MOBILE PAYMENT

FIELD OF THE INVENTION

The present disclosure relates to mobile payment and in some embodiments to a computer-implemented system and method for mobile payment using QR code.

BACKGROUND OF THE INVENTION

QR codes have spread far and wide as a payment method globally. They don't need fancy technology to operate: Shoppers can merely have the shop scan their personal code with a reader. It's low cost and straightforward to use. Sadly, that also suggests that QR codes are often easily stolen, replaced, or manipulated for scams. Shoppers face the danger of exposing their QR codes to unauthorized parties. Among the risks of mobile payment, scanning QR codes from behind unsuspecting victims is considered one of the most serious. As an example that was caught on surveillance footage, an offender photographed a victim's phone screen, which was showing his personal QR code on Alipay—Alibaba's payment app. Using that image, the offender was able to spend with the victim's account, deducted from his electronic wallet before the victim even finished paying for his meal (Shaanxi, 2018). There are now some 570 million mobile payment users in China—that's 1.75 times the US population. Among them, the QR code remains the most popular choice of payment method. There are alternatives to QR codes, including NFC as an option on mobile devices, but typically require more expensive hardware, and thus far have not caught on among consumers. Despite the dangers, it's unlikely people will stop using QR codes anytime soon. Accordingly, it is desirable to provide ways to shoppers to use masquerade to protect from QR code passing attacks.

In this patent application, the technology involves the utilization of QR codes (Quick Response codes) as a means of data encoding and retrieval. For the sake of brevity, the term "Quick Response code" will be abbreviated as "QR code" throughout this application. For clarity and consistency, the following definitions are provided:

"Quick Response code": Quick Response codes, abbreviated as "QR code," are two-dimensional barcodes that store information in a matrix pattern.

In this patent application, reference is made to RFC3230 (Request for Comments 3230) for the purpose of implementing certain protocols and standards. For the sake of brevity, the term "Request for Comments 3230" will be abbreviated as "RFC3230" throughout this application. For the sake of consistency and comprehension, the following definition is provided:

"RFC": Request for Comments refers to a series of documents maintained by the Internet Engineering Task Force (IETF) that define various protocols, standards, and procedures for the Internet.

SUMMARY

Systems and methods are disclosed herein for a shopper to make mobile payment using a sequence of QR code frames. An air gapped sequencer programmatically scans a screenshot of a generated QR code from a mobile payment app (e.g., Alipay, Apple Pay), converts the scanned file into a base64 encoded file, iterates the file line by line to make a QR code frame (aka frame) for each line for collecting into a resulting sequence. The Air gapped sequencer plays the resulting sequence frame by frame directly on the smartphone. A merchant to use a Cashier Device to scan animation frames displayed on the Air gapped sequencer, scan the animation frames to reassemble a QR code, and provide the QR code to a Payment Provider for the Payment Provider to broker a payment to the merchant according to one or more embodiments of the present disclosure. The Cashier device scans the animation to loop through all the frames to reassemble the generated QR code. The cashier device is programmed to filter half frames that are recorded between two consecutive frames, filter any duplicate frame that is the exact same as a previous frame, reassemble all valid frames into a reassembled base64 encoded sequence, and render the reassembled QR code for display via a data:image/jpeg; base64 encoding header.

The Cashier device by default scans screenshots in size of 16 KB, (i.e. about 100 mm), which translates to roughly less than 100 frames, so that a recording at 50 fps can finish re-assembling in about 10 seconds. The playback speed can vary depending on hardware, so that the cashier device should be able to record all frames.

A Payment Provider validates QR code received from Cashier Device to generate a response code to broker a payment transaction to a merchant according to one or more embodiments of the present disclosure.

A merchant uses a Cashier Device to scan frames of a QR code displayed on an Air gapped sequencer to provide authorized payment information to a Payment Provider for the Payment Provider to broker a payment to the merchant according to one or more embodiments of the present disclosure.

A Personal Device requests payment authorization and to receive response code from the payment provider for the merchant to conduct a payment transaction with the shopper according to one or more embodiments of the present disclosure.

BRIEF DESCRIPTIONS OF DRAWINGS

FIG. 1 shows a sample QR code generated for mobile payment.

FIG. 2 shows splitting a sample QR code into a plurality of animation frames.

DETAILED DESCRIPTION

Systems and methods are disclosed herein for a shopper to make mobile payment using a sequence of QR code frames. Referring to FIGS. 1 and 2. An air gapped sequencer programmatically scans a screenshot of a generated QR code from a mobile payment app (e.g., Alipay, Apple Pay), converts the scanned file into a base64 encoded file, iterates the file line by line to make a QR code frame (aka frame) for each line for collecting into a resulting sequence. The air gapped sequencer plays the resulting sequence frame by frame directly on an embedded display 342. A cashier device records the animation to loop through all the frames to reassemble the generated QR code. A cashier device is programmed to filter half frames that are recorded between two consecutive frames, filter any duplicate frame that is the exact same as a previous frame, reassemble all valid frames into a reassembled base64 encoded sequence, and render the reassembled QR code for display on the cashier device via a data:image/jpeg; base64 encoding header. In one or more embodiments, the cashier device would not reassemble the QR code if the first frame of the animation does not include a hex encoded checksum computed over the data payload. Further, in one or more other embodiments, a cashier device that conforms to RFC3230 would not reassemble the QR code if the first frame of the animation does not include a comparable Base64 value from the hex hash. A checkout app on the cashier device by default scans screenshots in size of 16 KB, (i.e. About 100 mm), which translates to roughly less than 100 frames, so that a cashier device recording at 50 fps can finish re-assembling in about 10 seconds. The playback speed can vary depending on hardware, so that a cashier device should be able to record all frames.

Figure 3:
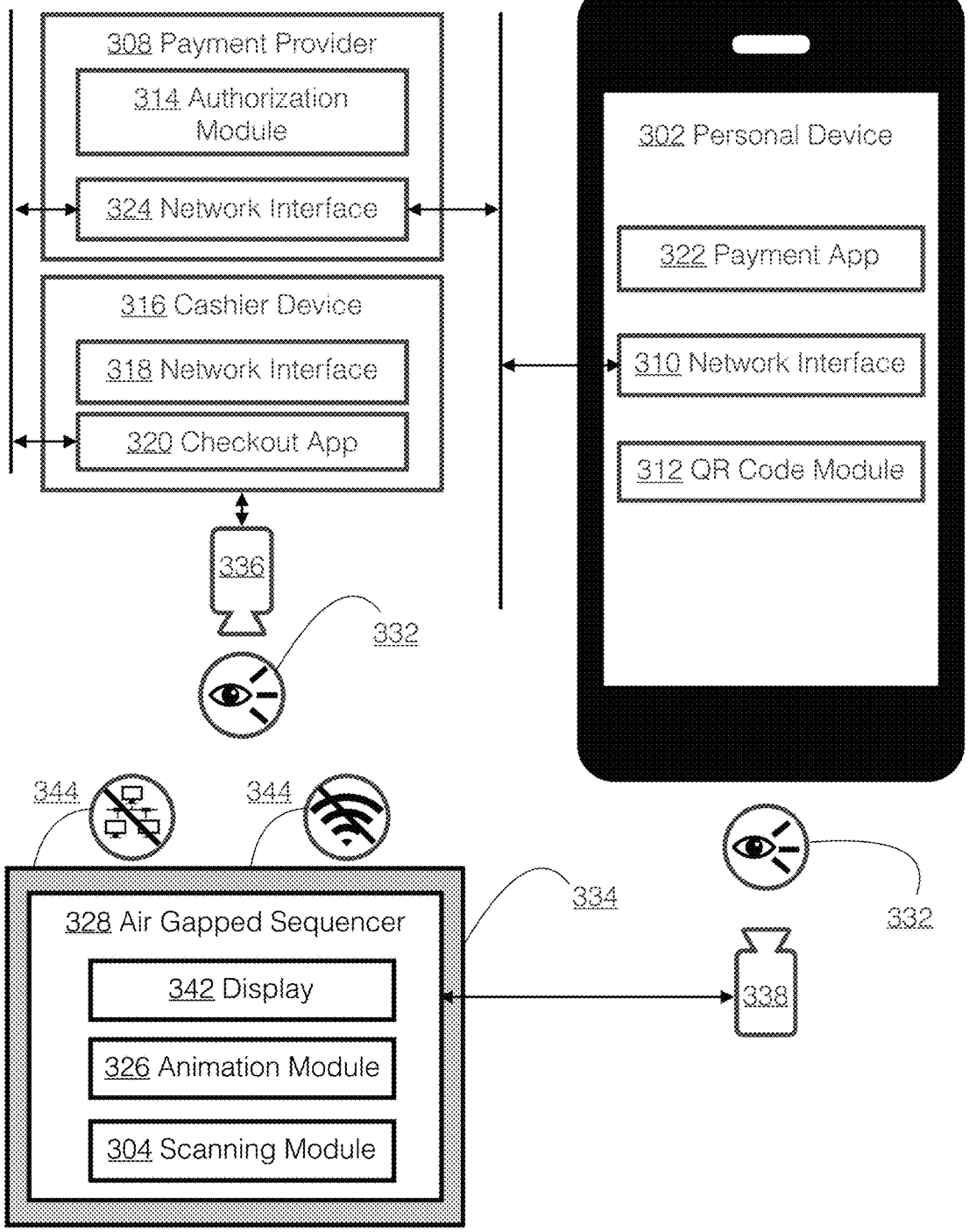
FIG. 3 shows a system for a merchant to use a cashier Device to scan animation frames displayed on an air gapped sequencer, scan the animation frames to reassemble a QR code, and provide the QR code to a Payment Provider for the Payment Provider to broker a payment to the merchant according to one or more embodiments of the present disclosure.

Refer now to FIG. 3. A shopper carries a personal device 302. Personal device 302 may be a smartphone or various other types of wireless or wired computing devices. It should be appreciated that personal device 302 may be referred to as a mobile device without departing from the scope of the present disclosure. Personal device 302 may communicate over an ip network 306 that is internet connected with a payment provider 308. A cashier device 316 hosts a merchant account and may also communicate with payment provider 308 over ip network 306. The merchant account may be operated by a financial institution, a merchant, or other entities providing online payment transactions to authorized users. In one embodiment, payment provider 308 may broker a payment transaction to cashier device 316 by shopper. Cashier device 316 may have a camera 336. In one or more embodiments, shopper having a personal device 302 wishes to make a payment to the merchant account on cashier device 316. Personal device 302 and payment provider 308 may be used to broker payment transactions to the merchant account on cashier device 316.

To broker payment transactions to cashier device 316 by shopper, payment provider 308 may have a network interface 310 that interfaces with ip network 306 to communicate with personal device 302 and cashier device 316. A QR code module 312 of personal device 302 may generate QR code for transmitting to payment provider 308 by cashier device 316. The QR code may include information to allow payment provider 308 to uniquely identify personal device 302 and to enable payment provider 308 to associate shopper/personal device 302 with a payment transaction on cashier device 316. For example, QR code may include information for a shopper to authorize payment provider 308 to initiate a payment transaction to cashier device 316, or to provide to payment provider 308 information required to complete a transaction by cashier device 316. Air gapped sequencer 328 may utilize camera 338 to scan the QR code generated by personal device 302 for scanning module 304 to size the QR code to a 16 KB file using a base64 encoding scheme. As a cybersecurity measure, air gapped sequencer 328 is not connected to ip network 306 or any other network that is internet connected. Further, air gapped sequencer 328 is encased in a thin layer of conductive metal mesh 334 to block any cellular signals, data, Wi-Fi or Bluetooth 344 from intruding into the device 328. Further, scanning module 304 iterates the file line by line to wherein one frame is produced for each line, thereby splitting the QR code into a plurality of animation frames for animation module 326 to display 342 and communicate to camera 336 on line of sight 332 between the air gapped sequencer 328 and cashier device 316. The frames may be reassembled by cashier device 316. While the exemplary embodiments described herein use QR code, scanning module 304 may generate other types of symbol or data encoding schemes, such as UPC code. Cashier device 316 may similarly capture or scan using these data encoding schemes with camera 336. Cashier device 316 may improve accuracy by filtering half frames that are recorded between two consecutive frames, and further filtering any duplicate frame that is the exact same as a previous frame. In one or more embodiments, cashier device 316 would not reassemble the QR code if the first of the animation frames does not include a hex encoded checksum computed over the data payload. In one or more other embodiments, cashier device 316 that conforms to RFC3230 would not reassemble the QR code if the first of the animation frames does not include a comparable Base64 value from the hex hash.

To display the QR code, a shopper may run a payment app 322 on personal device 302. The payment app 322 identifies personal device 302 to payment provider 308 through ip network 306. The payment app 322 and personal device 302 have previously been registered with payment provider 308 by shopper. As such, when the payment app 322 communicates with payment provider 308, a credit rating is established for the shopper. To lower the risk level, in one or more embodiments, a shopper may login to a member's account with payment provider 308. Shoppers may enter a user name and password such as an e-mail address and a PIN for the login credentials. Shoppers may enter the information on personal device 302 through a keyboard, keypad, touchscreen, or using voice command. Merchant may use air gapped sequencer 328 to scan the QR code displayed on personal device 302. Air gapped sequencer 328 may utilize camera 338 to scan the QR code generated by personal device 302 for scanning module 304 to size the QR code to a 16 KB file using a base64 encoding scheme. As a cybersecurity measure, air gapped sequencer 328 is not connected to ip network 306 or any other network that is internet connected. Further, air gapped sequencer 328 is encased in a thin layer of conductive metal mesh 334 to block any cellular signals, data, Wi-Fi or Bluetooth 344 from intruding into the device 328. Further, scanning module 304 iterates the file line by line to wherein one frame is produced for each line, thereby splitting the QR code into a plurality of animation frames for animation module 326 to display 342 and communicate to camera 336 on line of sight 332 between the air gapped sequencer 328 and cashier device 316. Cashier device 316 reassembles the QR code via a data:image/jpeg; base64 encoding header, and transmits the information to payment provider 308. In one or more embodiments, cashier device 316 may transmit the QR code image to payment provider 308 for decoding.

Authorization module 314 of payment provider 308 validates the QR code received from cashier device 316. Payment provider 308 may verify that the QR code identifies a member account that has authorized payment provider 308 to broker a payment transaction, such as from cashier device 316. Payment provider 308 may also verify that the QR code is associated with a payment transaction or with a request by cashier device 316 to request additional information from the shopper to further authenticate shopper or to complete a transaction. If cashier device 316 is requesting additional information, payment provider 308 may transmit a request to personal device 302 to prompt the shopper to enter the information on personal device 302. For example, payment provider 308 may request a shopper to provide debit card PIN for card-not-present authentication. In one embodiment, personal device 302 may store the debit card PIN entered by the shopper so that the PINs are automatically sent to payment provider 308 for card-not-present authentication the next time cashier device 316 conducts payment transactions with the shopper. Alternatively, payment provider 308 may request a shopper to provide sensitive information to complete a transaction on cashier device 316. Shoppers may enter the requested information into payment app 322 for personal device 302 to transmit the information to payment provider 308.

After validating the QR code, authorization module 314 evaluates the credit rating for shopper/personal device 302, any additional PINs received from shopper, and past history of personal device 302 to determine a level of risk for shopper/personal device 302. Authorization module 314 may create a response code for shoppers corresponding to the level of risk determined. For example, if a shopper has not logged into payment provider 308, the response code may have a higher level of risk. On the other hand, if a shopper has logged into payment provider 308 and has passed debit card PIN authentication, the response code may have a lower level of risk. Payment provider 308 may store the response code for retrieval by cashier device 316.

Cashier device 316 may use a network interface 318 to poll payment provider 308 to detect if a response code has been generated. In one or more embodiments, payment provider 308 may inform cashier device 316 that a response code is available for retrieval. In one or more embodiments, payment provider 308 may issue an instruction to personal device 302 directing merchants how to proceed. For example, when conducting a payment transaction, payment provider 308 may direct merchants to click on a "payment" button on cashier device 316 to proceed with the payment transaction. When the merchant does as directed, cashier device 316 may retrieve the response code and may inform merchant on cashier device 316 that a payment transaction has been accepted. A checkout app 320 of cashier device 316 may evaluate the response code to determine the spending limit, if any, that may be available to shoppers. Cashier device 316 may display the transactional information on cashier device 316 for merchants to access. When the QR code was provided for cashier device 316 to request additional information from the shopper, payment provider 308 may direct merchants to click on the "payment" button on checkout app 320 on cashier device 316 to retrieve the response code from payment provider 308. When the merchant does as directed, cashier device 316 may retrieve the response code to complete the transaction.

Figure 4:
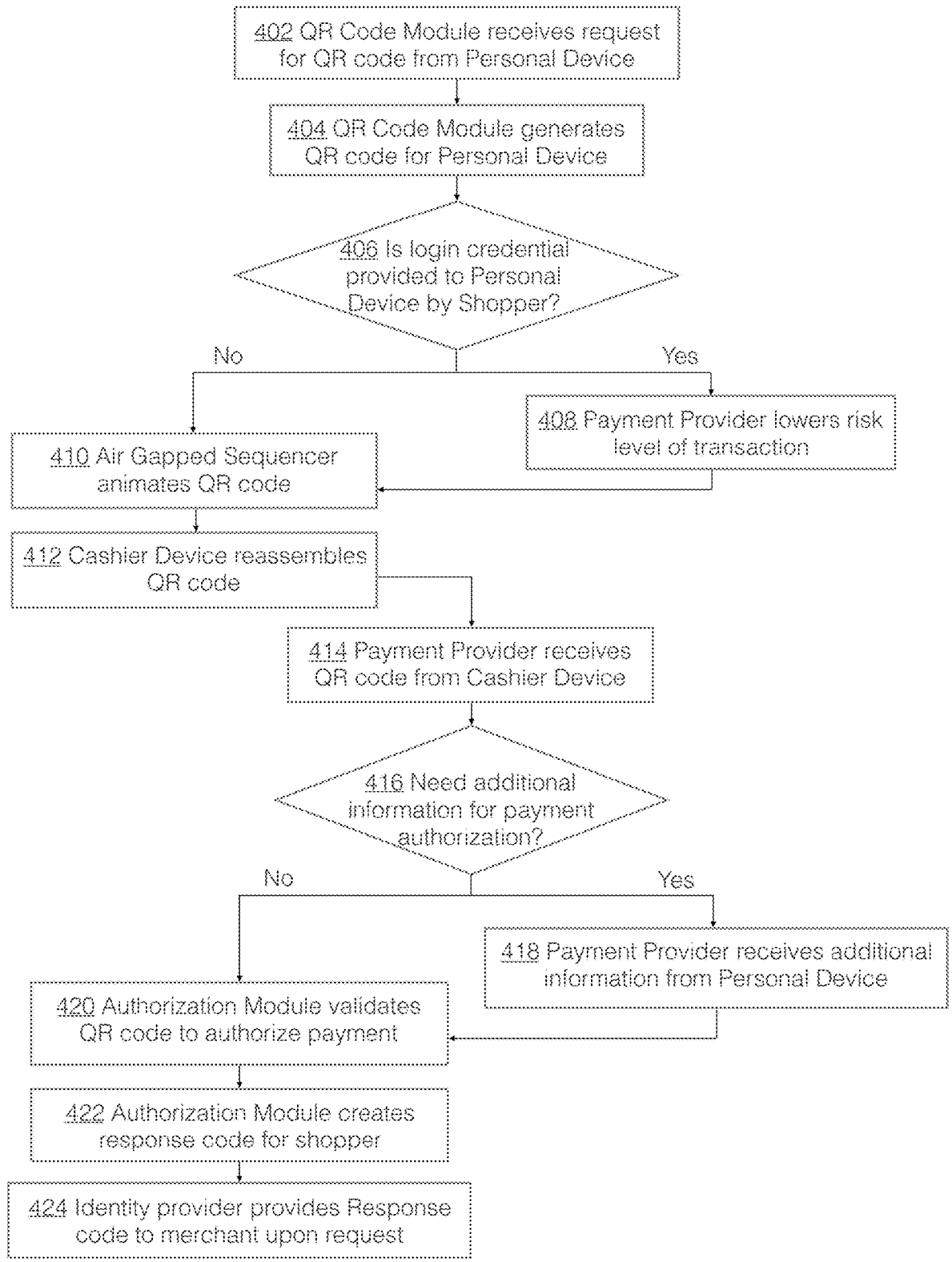
FIG. 4 shows a flow chart of the steps for Animation Module to generate frames of a QR code for a shopper and for a Payment Provider to validate the QR code received from a Cashier Device to generate a response code to broker a payment transaction to a merchant according to one or more embodiments of the present disclosure.

FIG. 4 shows a flow chart of the steps for a QR code module 312 of FIG. 3 to generate QR code for a shopper and for a payment provider 308 to validate the QR code received from a cashier device 316 to generate a response code to broker a payment transaction to the merchant account according to one or more embodiments of the present disclosure. In 402, QR code module 312 received a request for a QR code for authorizing a payment transaction from personal device 302. The QR code may include information to allow payment provider 308 to uniquely identify shopper and to enable payment provider 308 to associate shopper/personal device 302 with a payment transaction on cashier device 316. For example, the QR code may contain a key for retrieval of the member account associated with shopper/personal device 302 for the payment transaction, an identifier for personal device 302, and a time stamp. The time stamp may indicate a period of validity of the QR code.

In 404, QR code module 312 of personal device 302 generates the QR code. Air gapped sequencer 328 may utilize camera 338 to scan the generated QR code. Scanning module 304 sizes the QR code to a 16 KB file such that the QR code may be masqueraded by animation module 326. To prevent an offender from stealing QR code generated by personal device 302 from unsuspecting shopper, the QR code may be masqueraded into a plurality of animation frames to be read by checkout app 320 and reassembled within a reasonable amount of time by Cashier device 316. Air gapped sequencer 328 displays 342 animation of the plurality of frames wherein each frame is represented as a QR code. In one or more embodiments, QR code module 312 would include in the first of the plurality of animation frames a hex encoded checksum computed over the data payload. In one or more other embodiments, QR code module 312 may include a comparable Base64 value from the hex hash in the first of the plurality of animation frames. In one or more embodiments, the animation may be reassembled via a data:image/jpeg; base64 encoding header by payment provider 308. In one or more embodiments, the animation may be reassembled by the checkout app 320 from cashier device 316 via a data:image/jpeg; base64 encoding header.

QR code module 312 provides the QR code to personal device 302 for personal device 302 to display. Personal device 302 may also display a "payment" icon to inform shoppers that the QR code is for initiating a payment transaction. The QR code may also be scanned by merchants after payment provider 308 has generated the response code for cashier device 316 to retrieve the response code from payment provider 308. A merchant uses air gapped sequencer 328 to scan the QR code. Scanning module 304 converts the scanned QR code into animation frames. Animation module 326 displays the animation frames for checkout app 320 on cashier device 316 to scan and reassemble. Personal device 302 has previously been registered with payment provider 308 as belonging to shopper so that a credit rating is established for shopper when checkout app 320 communicates with payment provider 308. The credit rating is one factor payment provider 308 evaluates when generating the response code for the payment transaction. The higher the credit rating of shopper, the lower the level of risk in the response code generated for shopper, and the more of the spending limits of personal device 302 may be accessible by shopper. To lower the risk level, shoppers may enter login credentials for payment provider 308 into the personal device 302.

In 406, payment provider 308 determines if the shopper has provided login credentials from personal device 302. If login credentials are received, in 408, payment provider 308 logs in shopper and increases the credit rating for shopper. Otherwise, the credit rating remains unchanged. In 410, a merchant used camera 338 on air gapped sequencer 328 to scan the QR code for display 342 in animation. Further, in 412, merchants may enable camera 336 on cashier device 316 to scan the animation frames displayed on air gapped sequencer 328. Cashier device 316 is capable of correcting errors during transmission by filtering out half frames that are recorded between two consecutive frames, and further filtering out any duplicate frame that is the exact same as a previous frame. In one or more embodiments, cashier device 316 would not reassemble the QR code if the first of the scanned animation frames does not include a hex encoded checksum computed over the data payload. In one or more other embodiments, cashier device 316 that conforms to RFC3230 would not reassemble the QR code if the first of the scanned animation frames does not include a comparable Base64 value from the hex hash. Cashier device 316 uses a camera 336 to scan the animation frames and transmits the reassembled QR code to payment provider 308.

In 414, payment provider 308 receives the reassembled QR code from cashier device 316. In one or more embodiments, payment provider 308 may receive the un-reassembled animation frames from cashier device 316. Authorization module 314 of payment provider 308 may, if necessary, scan the animation frames and may reassemble the QR code. In 416, payment provider 308 determines if additional information is needed from the shopper for payment authorization by cashier device 316. The additional information may include PIN for associated member account or may include other sensitive information of the shopper. If additional information is needed, payment provider 308 may prompt shoppers for the information on personal device 302. In 418, payment provider 308 receives the additional information from personal device 302.

In 420, authorization module 314 validates the QR code to authorize payments. Authorization module 314 may verify that the time stamp for the QR code has not expired, that the QR code identifies personal device 302, and that the key for retrieval of the member account is associated with a payment transaction. Authorization module 314 also evaluates the credit rating for shopper, any additional information received from personal device 302, and history of personal device 302 to determine a level of risk for shopper. For example, if there is increased credit rating because shopper has logged into payment provider 308, shopper has provided additional information such as PINs for associated member accounts, and there is no history of fraudulent use associated with personal device 302, a lower level of risk may be determined for shopper. On the other hand, if there is just a regular credit rating because shopper has not logged into payment provider 308, and shopper has not provided additional information for payment provider 308, a higher level of risk may be determined.

In step 422, authorization module 314 generates a response code corresponding to the level of risk determined for shoppers. Payment provider 308 may inform cashier device 316 that a response code for a payment transaction is available. In one or more embodiments, payment provider 308 may transmit a message to cashier device 316 instructing merchants to retrieve the response code. For example, merchants may be instructed to click on the "payment" button displayed on checkout app 320. When the merchant clicks on the button, cashier device 316 requests the response code from payment provider 308. In 424, payment provider 308 provides the response code for merchant to cashier device 316. checkout app 320 may evaluate the response code to conduct a payment transaction for shopper and may provide services corresponding to the level of risk of the response code on Cashier device 316 for shopper to access. In one or more embodiments, personal device 302 may provide to payment provider 308 the additional information received from shoppers, such as the PINs to debit cards. Payment provider 308 may use the additional information to further authenticate shopper or to determine the spending limit presented to shopper.

Figure 5:
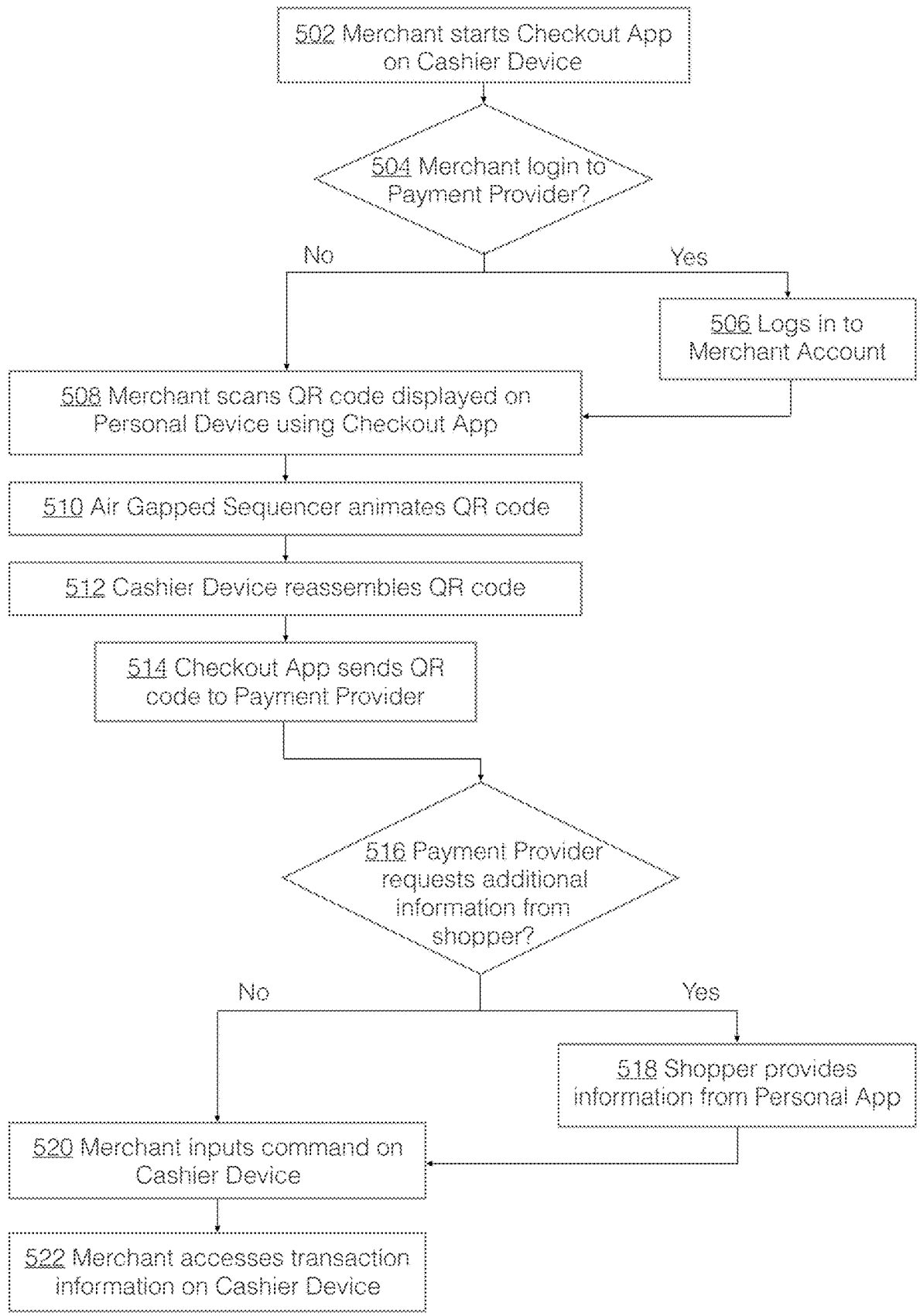
FIG. 5 shows a flow chart of the steps for a merchant to use a Cashier Device to scan frames of a QR code displayed on an air gapped sequencer to provide authorized payment information to a Payment Provider for the Payment Provider to broker a payment to the merchant according to one or more embodiments of the present disclosure.

FIG. 5 shows a flow chart of the steps for a merchant to use a cashier device 316 and air gapped sequencer 328 to scan QR code displayed on a personal device 302 of FIG. 3 to provide QR code to a payment provider 308 for the payment provider 308 to broker a payment transaction to a merchant or for the merchant to request additional information from the shopper according to one or more embodiments of the present disclosure.

In 502, merchants started a checkout app 320 on cashier device 316. The checkout app 320 may transmit identification information of cashier device 316 to payment provider 308. Cashier device 316 has previously been registered by merchant with payment provider 308. Therefore, payment provider 308 may associate the transmission from cashier device 316 with merchant to establish a credit rating for merchant. To lower the risk level, merchants may login to payment provider 308. In 504, merchants decided whether to login to the merchant's account with payment provider 308. If the answer is yes, the merchant enters merchant's login credentials into cashier device 316 in 506. Payment provider 308 may authenticate merchants to lower the risk level.

In 508, merchants scanned the QR code displayed on personal device 302 using camera 338 on air gapped sequencer 328. In 510, Scanning module 304 converts the scanned QR code into animation frames. Animation module 326 displays 342 the animation frames for checkout app 320 on cashier device 316 to scan and reassemble. Further, in 512, merchants may enable camera 336 on cashier device 316 to scan the animation frames displayed 342 on air gapped sequencer 328. Scanning module 304 converts the scanned QR code into animation frames. Animation module 326 displays the animation frames for checkout app 320 on cashier device 316 to scan and reassemble. The QR code may include information to allow shopper to authorize a payment transaction with cashier device 316 or to allow cashier device 316 to request additional information from payment provider 308 after shopper is already logged in. Merchant may scan the QR code using the air gapped sequencer 328 regardless of whether the merchant has logged in with payment provider 308. checkout app 320 may reassemble the QR code or may rely on payment provider 308 to reassemble the QR code. In one or more embodiments, the un-reassembled frames include a hex encoded checksum computed over the data payload. Further, in one or more other embodiments, the un-reassembled frames include a comparable Base64 value from the hex hash. The reassembling may use a data:image/jpeg; base64 encoding header for processing the frames, whereas the reassembling may not process the frames absent a hex encoded checksum. Further, reassembling that conforms to RFC3230 may not process the frames absent a comparable Base64 value from the hex hash. In 514, checkout app 320 transmits the reassembled QR code or un-reassembled frames to payment provider 308. Payment provider 308 may reassemble the QR code. Payment provider 308 may validate the QR code to determine whether the QR code is used for authorizing a payment transaction or to obtain additional information from the shopper. If the QR code is used to obtain additional information from the shopper to complete a transaction, payment provider 308 may determine the type of information needed.

In 516, payment provider 308 determines if it needs additional information from the shopper. If it does, payment provider 308 transmits a message to personal device 302 on the information needed. Personal device 302 may prompt shoppers to enter the requested information. In 518, shoppers enter the information into payment app 322 for personal device 302 to transmit the information to payment provider 308. In one or more embodiments, personal device 302 may store the entered information so that the information may be provided to payment provider 308 without user input. Payment provider 308 may evaluate the credit rating for shopper, any authentication information received, and history of personal device 302 to determine the level of risk. Payment provider 308 may generate a response code corresponding to the level of risk. If personal device 302 is used to provide additional information to payment provider 308 to complete a transaction after the shopper has already logged in, payment provider 308 may store the additional information.

In 520, cashier device 316 receives a message from payment provider 308 that a response code has been generated or that the requested information has been received. The message may contain instructions directing merchants how to activate cashier device 316 to retrieve the response code. For example, merchants may be directed to input a command to cashier device 316 such as to click on the QR code displayed on checkout app 320. Merchant inputs the command as directed. Cashier device 316 retrieves the response code from payment provider 308. Cashier device 316 may conduct a payment transaction and may display debit amount on checkout app 320 based on the response code. In 522, merchants accessed the transaction information through cashier device 316. In the case where cashier device 316 obtains transaction information for merchants who are already logged in, cashier device 316 may use the transaction information to complete a transaction. Merchants may proceed to carry out transactions with checkout app 320 on cashier device 316 and may close the checkout app 320 on cashier device 316.

Figure 6:
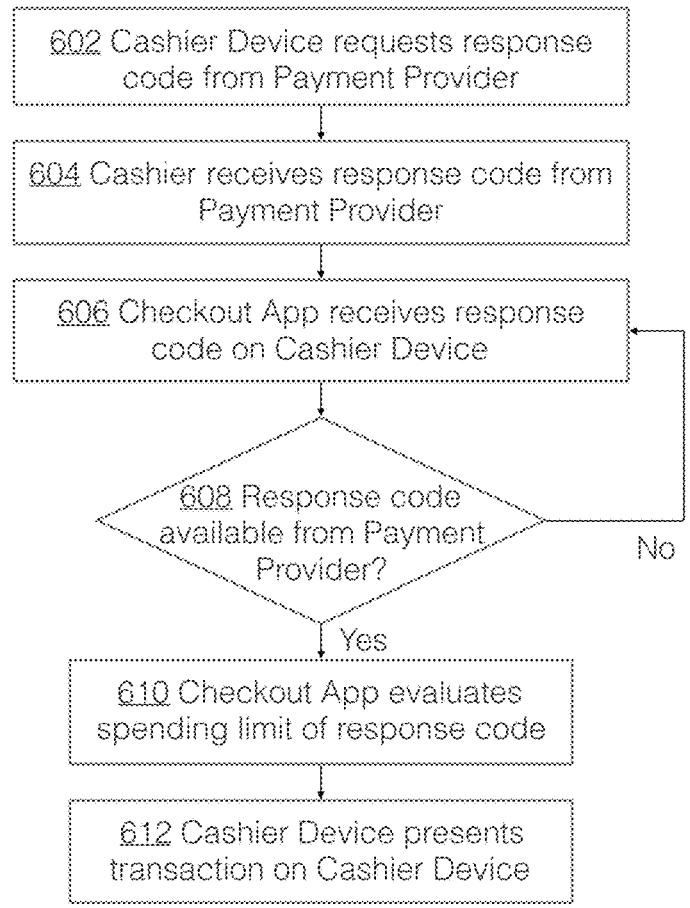
FIG. 6 shows a flow chart of the steps for a Personal Device to request payment authorization and to receive response code from the payment provider for the merchant

FIG. 6 shows a flow chart of the steps for a cashier device 316 of FIG. 3 to request response code and to receive response code from the payment provider 308 for the cashier device 316 to conduct a payment transaction associated with a user or display transactional information to the merchant according to one or more embodiments of the present disclosure.

In 602, cashier device 316 requests payment provider 308 to generate a response code. Cashier device 316 may provide information that identifies cashier device 316 and personal device 302 to payment provider 308. In addition, cashier device 316 may provide metadata that identifies the type of payment transaction requested by cashier device 316. Payment provider 308 may generate a response code that uniquely identifies cashier device 316 and that ties a transaction for a payment transaction on cashier device 316 to personal device 302.

In 604, cashier device 316 received the response code from payment provider 308. In 606, checkout app 320 receives the response code on cashier device 316. For example, for a payment transaction, cashier device 316 may display a "payment" button on checkout app 320 to inform merchants that the QR code has been successfully scanned to initiate a payment transaction using personal device 302. In one or more embodiments, cashier device 316 may display a message on checkout app 320 that shopper is requested to provide additional information using personal device 302. If the QR code is used for a payment transaction, when the merchant provides the QR code scanned from scanning module 304 to payment provider 308, payment provider 308 may generate a response code for the merchant corresponding to a level of risk. If the QR is used to collect additional information from the shopper, when the merchant provides the QR code, payment provider 308 may transact with shopper to collect the additional information via personal device 302.

In 608, cashier device 316 determines if the response code is available from payment provider 308. In one or more embodiments, cashier device 316 may poll payment provider 308. In one or more embodiments, cashier device 316 may receive an activation command from payment provider 308 that the response code is available when the merchant clicks on the "payment" button displayed on checkout app 320 as directed by payment provider 308. Cashier device 316 may retrieve the response code. In one or more embodiments, cashier device 316 may use the response code to complete the transaction requiring the information. Checkout app 320 may proceed to carry out transactions with shoppers on cashier device 316.

In 610, if the response code was retrieved by cashier device 316 for a payment transaction, checkout app 320 may evaluate the response code to determine the spending limit for the shopper, if any, that may be accessed by the merchant. In 612, cashier device 316 conducts the payment transaction and presents the transactional information on cashier device 316 for merchants to access.

The invention claimed is:

1. A mobile computing system for scanning animation frames to provide authorized payment information for brokering a payment transaction to a merchant account, wherein the animation frames is characterized by a first frame including one of a hex encoded checksum computed over the animation frames and a comparable base64 value from the hex encoded checksum, the system comprising:
   a shopper device, displaying a first Quick Response (QR) code generated by a payment provider, in communication with the payment provider via a first ip network that is internet connected;
   one or more cameras connected to a second ip network in communication with one or more hardware processors through the second ip network, wherein the one or more hardware processors is coupled to a transitory memory storing animation of QR codes scanned from the animation frames, the one or more hardware processors operable to read instructions from the memory to perform the steps of:
   generating, by the payment provider, a first QR code for displaying on the shopper device, wherein the first QR code comprises the authorized payment information for brokering the payment transaction to the merchant account in association with the shopper device;
   converting, by the one or more air gapped sequencers, the first QR code into a first plurality of animation frames, wherein the one or more air gapped sequencers:
   scan the first QR code via cameras embedded on the one or more air gapped sequencers,
   split the scanned QR code into the first plurality of animation frames, and
   display the first plurality of animation frames;
   obtaining a second plurality of animation frames by scanning the first plurality of animation frames on line of sights between the one or more air gapped sequencers and the one or more cameras in communication with the one or more hardware processors through the second ip network, wherein the second plurality of animation frames are stored in the transitory memory;

reassembling a second QR code from the second plurality of animation frames by:

filtering invalid frames from the second plurality of animation frames in the transitory memory to obtain filtered frames;

converting the filtered frames into a base64 encoded sequence; and retrieving a checksum included in a first frame of the filtered frames to:

determine support for Request Message Format (RFC3230) protocol implementation from the instructions read from the memory, decode the checksum for a hex hash when RFC3230 implementation is not supported, and decode the checksum for a comparable base64 value from the hex hash when RFC3230 implementation is supported;

providing the second QR code to the payment provider in communication via the second ip network when the checksum is decoded to obtain the comparable base64 value when the RFC3230 implementation is supported;

generating, by the payment provider in response to receiving the second QR code, a response code that uniquely identifies the merchant account and ties the payment transaction to the shopper device;

determining availability of the response code by polling the payment provider in communication via the second ip network; and retrieving the response code from the payment provider to conduct the payment transaction based on the response code when the response code is available for retrieval; and one or more air gapped sequencers, the one or more air gapped sequencers operate independently and remain disconnected from both the first ip network and the second ip network.

2. The system of claim 1, further comprising a retrieval module retrieving relevant information about the merchant account from a knowledge source, such as online documents, databases, or other relevant materials.

* * * * *